United States Patent
Oya et al.

(10) Patent No.: US 10,395,046 B2
(45) Date of Patent: Aug. 27, 2019

(54) WORK PROCESS MANAGEMENT SYSTEM, INDIVIDUAL CONTROLLER USED THEREIN, AND ACCESS RESTRICTION METHOD

(71) Applicant: OMRON Corporation, Kyoto-shi, Kyoto (JP)

(72) Inventors: Taku Oya, Kyoto (JP); Hiroyuki Yanagi, Mukou (JP); Nobuyuki Sakatani, Otsu (JP); Masanori Takahashi, Kyoto (JP); Yasuaki Abe, Soraku-gun (JP)

(73) Assignee: OMRON Corporation, Kyoto-shi (JP)

( * ) Notice: Subject to any disclaimer, the term of this patent is extended or adjusted under 35 U.S.C. 154(b) by 237 days.

(21) Appl. No.: 15/121,871

(22) PCT Filed: Feb. 19, 2015

(86) PCT No.: PCT/JP2015/054525
§ 371 (c)(1),
(2) Date: Aug. 26, 2016

(87) PCT Pub. No.: WO2015/137071
PCT Pub. Date: Sep. 17, 2015

(65) Prior Publication Data
US 2017/0132422 A1   May 11, 2017

(30) Foreign Application Priority Data

Mar. 14, 2014 (JP) .................................. 2014-052347

(51) Int. Cl.
*G06F 21/60* (2013.01)
*G05B 19/418* (2006.01)
*G06F 21/62* (2013.01)

(52) U.S. Cl.
CPC ...... *G06F 21/604* (2013.01); *G05B 19/41865* (2013.01); *G06F 21/6218* (2013.01); *Y02P 90/10* (2015.11); *Y02P 90/20* (2015.11)

(58) Field of Classification Search
CPC .......................... G06F 21/604; G06F 21/6218
(Continued)

(56) References Cited

U.S. PATENT DOCUMENTS 5,980,078 A    11/1999  Krivoshein et al.
6,769,067 B1 *  7/2004  Soong .................... H04L 63/10
                                                    726/1
(Continued)

FOREIGN PATENT DOCUMENTS

CN    102122340 A    7/2011
CN    102867272 A    1/2013
(Continued)

OTHER PUBLICATIONS

Teh, "IBI-Mobile Authentication: A Prototype to Facilitate Access Control Using Identity-Based Identification on Mobile Smart Devices", Apr. 26, 2016, Springer, pp. 127-144 (Year: 2016).*
(Continued)

*Primary Examiner* — Kenneth W Chang
*Assistant Examiner* — Gregory A Lane
(74) *Attorney, Agent, or Firm* — Metrolex IP Law Group, PLLC (57) ABSTRACT

A work process management system includes at least one work device and an individual controller that is directly or indirectly attached to a work object to control the work device. Each of the work device includes a work-device-side storage, a work-device-side communicator, a work part, and a work-device-side control part. The individual controller includes an individual-controller-side storage in which a work content of a work process performed with the work (Continued)

device and associated setting information are stored, an individual-controller-side communicator, and an individual-controller-side calculation controller that transmits the work content of the work process performed with the work device and the associated setting information in which a performance result is reflected to the work-device-side communicator, and additionally store the received performance result in the individual-controller-side storage.

6 Claims, 5 Drawing Sheets

(58) Field of Classification Search
USPC .............................................................. 726/1
See application file for complete search history.

(56) References Cited

U.S. PATENT DOCUMENTS

| | | | |
|---|---|---|---|
| 7,636,044 B1 | 12/2009 | Callaghan | |
| 7,921,450 B1* | 4/2011 | Vainstein | G06F 21/6209 |
| | | | 380/285 |
| 8,768,071 B2* | 7/2014 | Tsuchinaga | G06K 9/6857 |
| | | | 382/226 |
| 2003/0055667 A1 | 3/2003 | Sgambaro et al. | |
| 2004/0162628 A1 | 8/2004 | Mori | |
| 2005/0015471 A1* | 1/2005 | Zhang | H04L 63/0442 |
| | | | 709/221 |
| 2006/0085839 A1* | 4/2006 | Brandt | G05B 19/4185 |
| | | | 726/2 |
| 2006/0191017 A1* | 8/2006 | Hieda | G06F 21/6218 |
| | | | 726/27 |
| 2007/0156255 A1* | 7/2007 | Herrmann | G05B 19/41865 |
| | | | 700/17 |
| 2008/0218349 A1 | 9/2008 | Maeda et al. | |
| 2011/0213969 A1* | 9/2011 | Nakhjiri | H04L 63/061 |
| | | | 713/158 |
| 2011/0276706 A1* | 11/2011 | Chene | H04L 67/00 |
| | | | 709/228 |
| 2011/0291834 A1 | 12/2011 | Boldyrev et al. | |

FOREIGN PATENT DOCUMENTS

| | | |
|---|---|---|
| CN | 102918510 A | 2/2013 |
| JP | 2004-501417 A | 1/2004 |
| JP | 2008-225588 A | 9/2008 |
| JP | 2009-087132 A | 4/2009 |
| JP | 2012-234470 A | 11/2012 |

OTHER PUBLICATIONS

The extended European search report dated Jan. 18, 2018 in a counterpart European Patent application.
The extended Chinese Office Action dated Feb. 24, 2018 in a counterpart Chinese Patent application.

* cited by examiner

WORK PROCESS MANAGEMENT SYSTEM, INDIVIDUAL CONTROLLER USED THEREIN, AND ACCESS RESTRICTION METHOD

TECHNICAL FIELD

The present invention relates to work process management of a work process in a production system that automatically produces a wide variety of product with a PLC (Programmable Logic Controller) that controls machines and devices according to a sequence program, particularly to a work process management system that enables concealment of test data or authentication during disclosure, an individual controller used in the work process management system, and a method for restricting access to the individual controller.

BACKGROUND ART

In conventional multi-product production, a product is managed in each kind, and the production is performed while a manufacturing process is rearranged each time by monitoring an order reception state and an order reception prediction of each product kind. However, in this method, a man-hour in the rearrangement and tuning of the device increases extremely in the case that the kind of the product to be produced increases extremely while the order reception state is unstable, or in the case that on-demand production is performed without the order reception prediction (product varies individually).

In "radio IC tag utilizing multi-product automatic production system with radio PLC" proposed by Patent Document 1, in which the kind of the product is identified by reading tag information from a radio IC tag attached to a workpiece and a work program for the device on a production line is automatically changed.

However, in the conventional technology of Patent Document 1, it is necessary that a user program, an image processing item, and tuning setting value be previously stored in a PLC, an image sensor, and a robot with respect to all the presumed products, and it is necessary that the production line be automatically re-tuned each time by acquiring identification information about each product at the beginning of the process. Therefore, the tuning can hardly be performed when an unknown product that is not presumed in each device flows in the process.

In "RFID (Radio Frequency IDentification) system and RFID tag" proposed by Patent Document 2, not only a product kind but also a content to be performed are stored in a radio IC tag. In the RFID system of Patent Document 2, product- or component-associated information such as a work content and a test result is sequentially written in the RFID tag, and a state of the product or component to which the RFID tag is attached is managed by referring to data stored in the RFID tag (see paragraph number [0002] of Patent Document 2). That is, the test data is stored in the radio IC tag or RFID.

However, because a memory capacity is restricted in an inexpensive radio IC tag, it is difficult to directly store a large amount of data. On the other hand, the use of a large-capacity radio IC tag leads to a substantial increase in cost.

In "production management system and quartz oscillator" proposed by Patent Document 3, all the pieces of test data are stored in a server while paired with the identification information about the radio IC tag, and the test data stored in the server can be referred to by accessing the server in a subsequent process using the identification information about the radio IC tag.

On the other hand, in "information system and method thereof" proposed by Patent Document 4, pieces of information about the products or services supplied by plural manufacturers are stored in a central database, each product includes an identifier such as the RFID, and a customer reads the identifier to access the central database, which allows the customer to obtain the information about each product.

PRIOR ART DOCUMENTS

Patent Documents

Patent Document 1: Japanese Unexamined Patent Publication No, 2009-087132
Patent Document 2: Japanese Unexamined Patent Publication No. 2008-225588
Patent Document 3: Japanese Unexamined Patent Publication No. 2012-234470
Patent Document 4: Japanese Translation of PCT Publication No, 2004-501417

SUMMARY OF THE INVENTION

Problems to be Solved by the Invention

For example, in the case that the product received from a supplier is tested, because sampling test is not necessarily enough, it is necessary to perform a test corresponding to a total test. In this case, the man-hour in the rearrangement and tuning of the device also increases. In order to suppress the increase in man-hour as much as possible, there is a need for obtaining individual test data from a supplier side to eliminate a reception test process overlapping a pre-shipment test performed on the supplier side. However, the information that can be provided from the supplier side to a reception side becomes restrictive in consideration of a security phase, and the significant elimination of the process is hardly performed.

In the conventional technologies described in Patent Documents 2 to 4, although the test data is easily acquired on the reception side, the supplier side hardly applies browsing restriction to the test data. It is also difficult to write a device program in which the acquired test data is used.

In the conventional technologies described in Patent Documents 3 and 4, it is necessary to construct a database in a server shared by the supplier and the reception side, and the technologies hardly deal with the multi-product production, in which a trading partner or a volume of business is unstable, from the viewpoint of mounting and operation.

An object of the present invention is to provide a work process management system, an individual controller used therein, and an access restriction method of the present invention for being able to apply the browsing restriction from the supplier side to the pre-shipment test data, for being able to easily use the data acquired and browsed on the reception side in the device program, and for being able to exchange the test data with easy mounting and operation even if the trading partner or the volume of business is unstable.

Means for Solving the Problem

According to one aspect of the present invention, a work process management system includes: at least one work device configured to perform at least one work process on a work object; and an individual controller that is directly or indirectly attached to the work object to control the work device.

The work device includes: a work-device-side communicator configured to conduct external radio communication, and configured to be able to transmit characteristic identification information; a work part configured to perform the work process: and a work-device-side control part configured to transmit an access request to access associated information associated with a work content of the work process or the work object through the work-device-side communicator, and configured to control the work process performed with the work part based on a reception result received by the access request and a command received through the work-device-side communicator.

The individual controller includes: an individual-controller-side storage in which the work content of the work process, the associated information, and access restriction information about the associated information are stored with respect to the work object of a corresponding kind; an individual-controller-side communicator configured to perform external radio communication; and an individual-controller-side calculation controller configured to transmit the work content of the work process corresponding to the work device as the command to the work device through the individual-controller-side communicator, configured to, when receiving the access request to access to the associated information from the work device through the individual-controller-side communicator, identify a kind of the work device based on the characteristic identification information received from the work device and determine whether the access is permitted based on the access restriction information, and configured to transmit the associated information to the work device through the individual-controller-side communicator only when permitting the access.

As used herein, the "work" is a high-level concept including not only "production" and "manufacturing" but also "assembly", "test", and "packing". Examples of the "work process management system" include, but are not limited to, a production management system or a manufacturing management system in a factory. Examples of the "work device" include, but are not limited to, a defective determining device to which an image processing technology is applied and a P & P (Pick & Place) device that removes a component determined to be defective from the production line. The "associated information" means information associated with the work content of the work process or information associated with the work object per se. A measured value obtained by the test or a quality determination based on a test result is cited as an example of the former information, but the former information is not limited thereto. The price of the work object is cited as an example of the latter information, but the latter information is not limited thereto.

Preferably the access restriction information includes: first access restriction information previously stored in the individual-controller-side storage; and second access restriction information that is subsequently stored in the individual-controller-side storage to further restrict an access restriction range of the first access restriction information. Preferably rewriting of the first access restriction information is prohibited. That the individual-controller-side calculation controller determines whether access is permitted based on the access restriction information may be mounted using a function block.

In the work process management system having the above configuration, for example, the browsing restriction can be applied from the supplier side to the pre-shipment test data that is the associated information associated with the work process content, the data acquired and browsed on the reception side can be easily used in the device program, and the test data can be exchanged with the easy mounting and operation even if the trading partner or the volume of business is unstable.

The present invention also includes the individual controller per se used in the work process management system.

According to another aspect of the present invention, an access restriction method for restricting access to associated information associated with a work content of a work process or a work object in an individual controller that is directly or indirectly attached to the work object to control the work device configured to perform the work process on the work object, the access restriction method includes the steps of: storing the work content of the work process, the associated information, and access restriction information about the associated information being stored with respect to the work object of a corresponding kind; when an access request to access to the associated information is received by radio from the work device, identifying a kind of the work device based on characteristic identification information about the work device, the characteristic identification information being received by radio from the work device and determining whether the access is permitted based on the access restriction information; and transmitting the associated information to the work device only when the access is permitted.

Preferably the storage step includes: a first storage step of previously storing first access restriction information: and a second storage step of subsequently storing second access restriction information further restricting an access restriction range of the first access restriction information.

In the access restriction method having the above configuration, for example, the browsing restriction can be applied from the supplier side to the pre-shipment test data that is the associated information associated with the work process content, the data acquired and browsed on the reception side can be easily used in the device program, and the test data can be exchanged with easy mounting and operation even if the trading partner or the volume of business is unstable.

Effect of the Invention

In the work process management system, the individual controller used therein, and the access restriction method of the present invention, for example, the browsing restriction can be applied from the supplier side to the pre-shipment test data that is the associated information associated with the work process content, the data acquired and browsed on the reception side can be easily used in the device program, and the test data can be exchanged with easy mounting and operation even if the trading partner or the volume of business is unstable.

MODE FOR CARRYING OUT THE INVENTION

Hereinafter, a production management system 100 according to an embodiment of the present invention will be described with reference to the drawings. The present invention can be applied to not only production management or manufacturing management in a factory but also a system that manages a wide range of various kinds of work. At this point, the term "work" is used as a high-level concept of "production", "manufacturing", and the like.

<Schematic Configuration of Production Management System 100>

Figure 1:
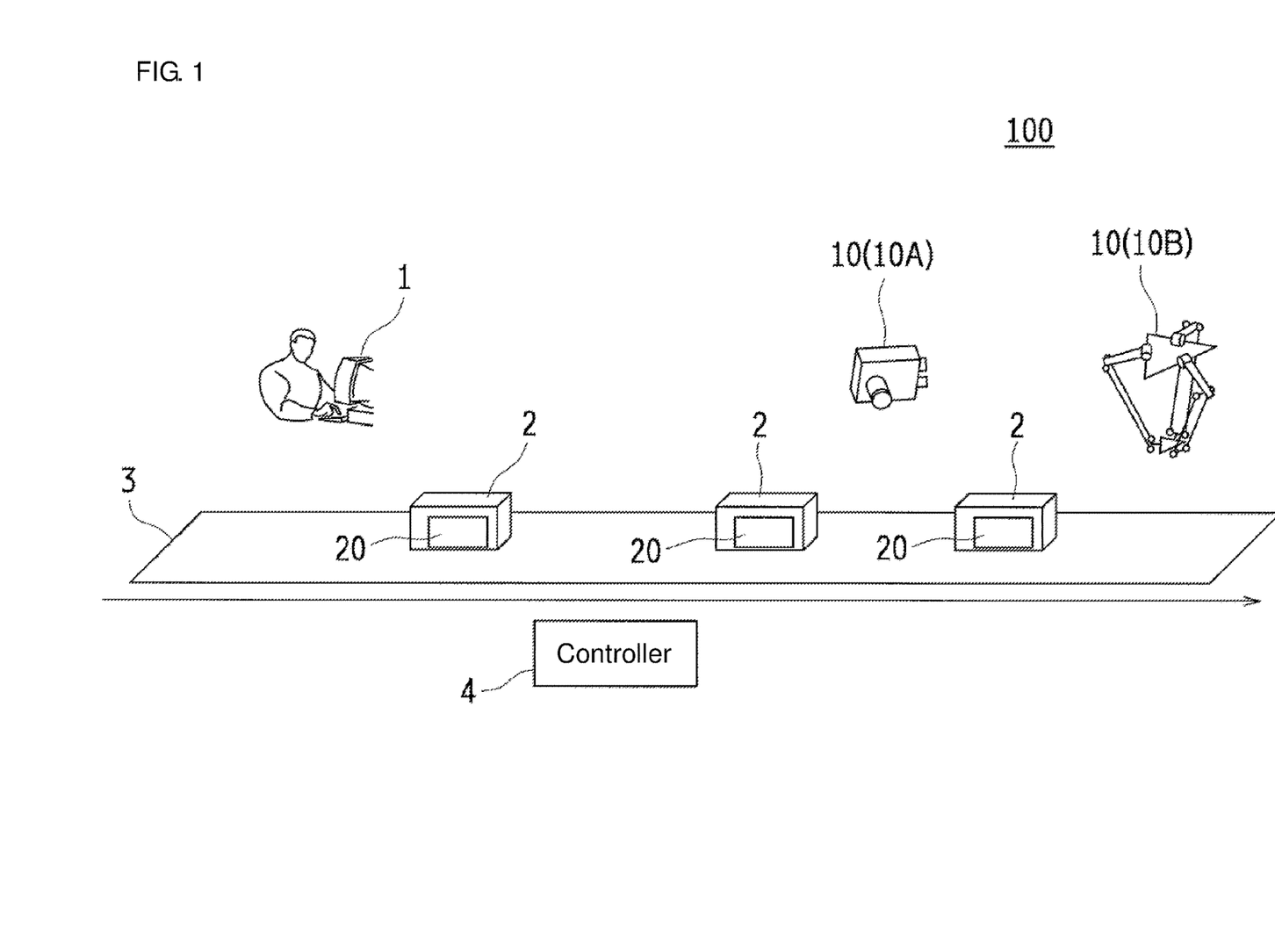
FIG. 1 is an overview diagram of a production management system 100 according to an embodiment of the present invention.

FIG. 1 is an overview diagram of the production management system 100 according to the embodiment of the present invention. The production management system 100 includes at least one work device 10 and a tag type controller 20. The work device 10 performs at least one work process such as a production process and a test process on each workpiece 2 (work object), such as various components or products, which flow on a conveyer 3 that is a part of a production line. The tag type controller 20 is attached to each workpiece 2, and controls each work device 10 such that the work device 10 is caused to perform the work process corresponding to a kind of the workpiece 2.

An image processing device 10A and a P & P device 10B are cited as an example of the work device 10. The image processing device 10A detects a shape or a size of the workpiece 2 or checks an abnormality of an appearance on the basis of an imaging result of the workpiece 2, and determines whether the workpiece 2 is defective and a P & P device 10B removes the workpiece 2 from the conveyer 3 according to an external command. Additionally, examples of the work device 10 include an assembling device, a test device, and a packing device, but are not limited thereto. The image processing device 10A and the P & P device 10B are collectively called the work device 10 unless required to be distinguished from each other.

The tag type controller 20 is directly or indirectly attached to each workpiece 2 similarly to the conventional radio IC tag or RFID tag. For example, when the workpiece 2 is relatively large, the tag type controller 20 may directly adhere to a side surface of the workpiece 2. On the other hand, when the workpiece 2 is relatively small, the tag type controller 20 may be attached to a container that accommodates the workpiece 2. Depending on the shape of the workpiece 2, the tag type controller 20 can be attached to a stage on which the workpiece 2 is placed.

A user PC (Personal Computer) 1 includes a radio communication interface, and conducts radio communication with the tag type controller 20 as necessary. The detailed radio communication is described later.

In the conveyer 3, a conveyer driving controller 4 controls start and stop of drive and a drive speed. Each workpiece 2 on the conveyer 3 usually moves at a constant speed, and such the work processes as the production process and the test process are sequentially performed with the work devices 10 disposed along the conveyer 3.

Figure 2:
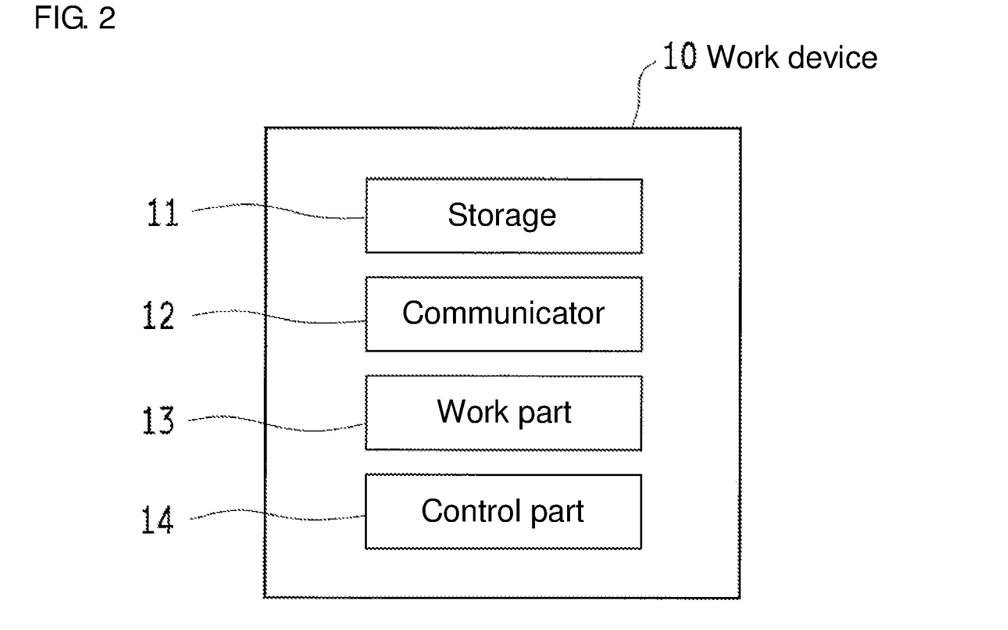
FIG. 2 is a schematic diagram illustrating a basic configuration common to each work device 10 in the production management system 100.

FIG. 2 is a schematic diagram illustrating a basic configuration common to each work device 10 in the production management system 100. As illustrated in FIG. 2, each work device 10 includes a storage 11, a work part 13, a communicator 12, and a control part 14.

A work-process work content and work-process-associated setting information are stored in the storage 11. Various pieces of data during the work and work result information may be stored in the storage 11. Examples of the work content and associated setting information, which are dealt with the image processing device 10A, include a processing item, a true value data (true value image data, shape information, and current position), real image data, and a non-defective and defective determination result, but are not limited thereto. A command value to the P & P device 10B is cited as an example of the data dealt with the image processing device 10A, but the data is not limited thereto.

The communicator 12 includes a radio transmitter and receiver and an antenna, and conducts the radio communication with the outside (for example, the tag type controller 20).

It is not always necessary for the communicator 12 per se to conduct the radio communication. For example, the communicator 12 can conduct only wired network communication while being connected to a radio router, and the communicator 12 may conduct the radio communication with the outside through the radio router.

The work part 13 performs the work process on the basis of the work content and associated setting information, which are stored in the storage 11.

As need arises, the control part 14 updates at least a part of the work content and associated setting information, which are stored in the storage 11, according to a command received through the communicator 12. The performance of the work process with the work part 13 is controlled on the basis of the updated work content and associated setting information.

Figure 3:
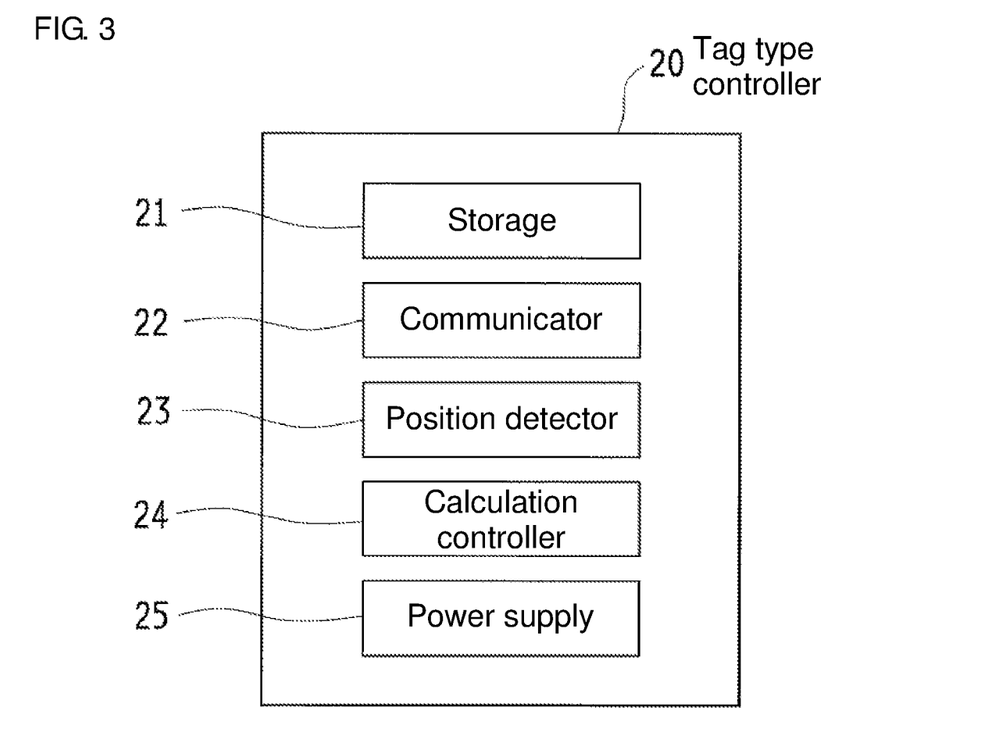
FIG. 3 is a schematic diagram illustrating a configuration of a tag type controller 20 used in the production management system 100.

FIG. 3 is a schematic diagram illustrating a configuration of the tag type controller 20 used in the production management system 100. As illustrated in FIG. 3, each tag type controller 20 includes a storage 21, a position detector 23, a communicator 22, a calculation controller 24, and a power supply 25.

The work content, which is performed with the work device 10 on the kind of the workpiece 2 corresponding to the tag type controller 20 in each work process, and the associated setting information are stored in the storage 21. A position where each work device 10 is disposed is also previously stored in the storage 21.

The communicator 22 includes a radio transmitter and receiver and an antenna, and conducts the radio communication with the outside such as the user PC 1. The work content and associated setting information, which are stored in the storage 21, are received from the outside such as the user PC 1 through the communicator 22.

The position detector 23 detects a current position on the conveyer 3 on the basis of an initial position and a moving speed on the conveyer 3 and an elapsed time since the start of the movement. The moving speed on the conveyer 3 may be acquired from the conveyer driving controller 4 through the communicator 22.

The calculation controller 24 transmits a command, which is issued to the work device 10, to the communicator 12 on the side of the work device 10 through the communicator 12. In the command, each work process performance result is reflected in the work content and associated setting information of the work process performed with the work device 10, the work content and associated setting information being stored in the storage 21. The calculation controller 24 additionally stores the work process performance result received from the communicator 12 through the communicator 22 in the storage 21.

The power supply 25 supplies power to the storage 21, the position detector 23, the communicator 22, and the calculation controller 24. For example, the power supply 25 may be a button battery similarly to the active IC tag. If possible, preferably electric power is externally supplied by a non-contact electric power transmission scheme (for example, adoption of electromagnetic induction) such that labor and time for management of a battery residual quantity or battery exchange are saved. For the adoption of the electromagnetic induction, for example, a magnetic force generation device may be disposed below or around the conveyer 3.

A storage battery, which stores the externally-supplied electric power therein and discharges the electric power as needed, may be included. Therefore, the magnetic force generation device needs not to be disposed everyplace along the conveyer 3, or the storage battery can be charged in another place except for the conveyer 3.

Currently, from the viewpoint of supposed cost, the tag type controller 20 is preferably detached from the workpiece 2 to be recovered and reused after the use in the production line. However, the tag type controller 20 is not necessarily recovered and reused. For example, necessity of the recovery is lowered when cost is reduced like the current radio IC tag. For example, both the cost reduction of the tag type controller 20 and the compact tag type controller 20 enables a system configuration in which the tag type controller 20 is previously incorporated in the workpiece 2.

<Screw Test Process of Production Management System 100>

Figure 4:
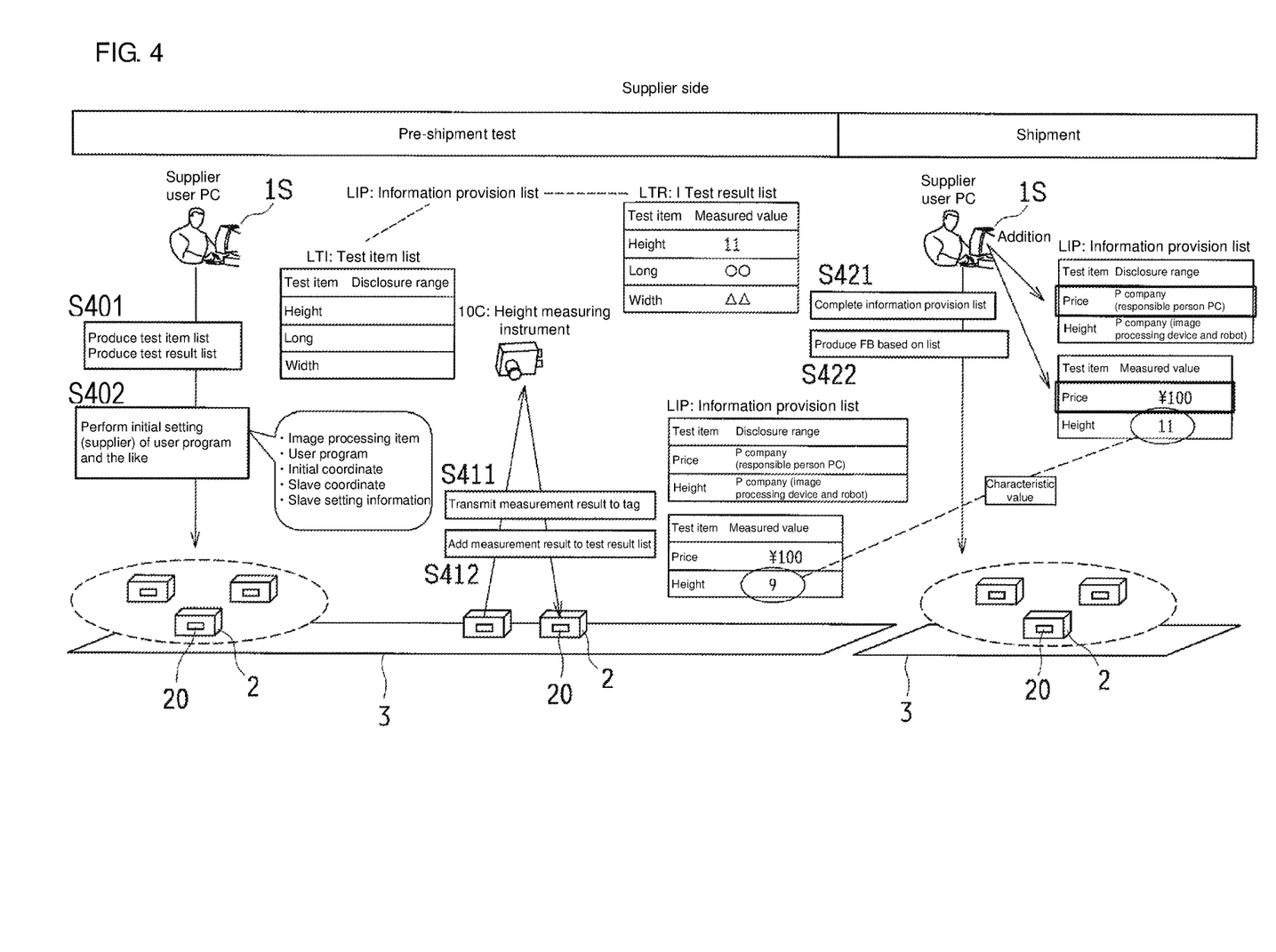
FIG. 4 is a schematic diagram illustrating a flow from a "pre-shipment test" to "shipment" on a supplier side in a screw test process of the production management system 100.

FIG. 4 is a schematic diagram illustrating a flow from a "pre-shipment test" to "shipment" on a supplier side in a screw test process of the production management system 100, In FIG. 4, each process is performed from the left to the right (the same holds true for FIGS. 5 and 6 to be described later).

1 Pre-Shipment Test

A worker of a supplier produces a test item list LTI and a test result list LTR with the supplier-side PC 1S (S401), and transmits the test item list LTI and the test result list LTR to the tag type controller 20. The test item list LTI and the test result list LTR are stored in the storage 21.

As used herein, the test item list LTI is one in which a test item and its disclosure range of the workpiece 2 are listed as needed while paired. Examples of the test item include a height, a length in a longitudinal direction, and a length in a crosswise direction of the workpiece 2 that is of a test target, but is not limited thereto. The test item is not limited to a name of the test, but the test item also includes a "price" (to be described later). At this point, the disclosure range of each test item needs not to be input (null), or the disclosure range where the test item is not input yet may be dealt with as disclosure prohibition. The test result list LTR is one in which the test item and its measured value are listed while paired, and each test item is the same as the test item list LTI. At this point, the measured value of each test item is not input yet (null). An information provision list LIP includes information, in which the test item in which some sort of range is input to the disclosure range and the disclosure range of the test item are extracted from the test item list LTI, and information in which the test item and its measured value are extracted from the test result list LTR.

For example, the information provision list LIP can be calculated from design data (data of three-dimensional CAD) of a supplier-side component. When the supposed test items are standardized, the disclosure and non-disclosure of each test item can be assigned only by a flag. Alternatively, not all but at least a part of the test items is standardized, the disclosure and non-disclosure of the standardized test item may be assigned by the flag, and other test items may be published in the information provision list LIP.

Then, the supplier-side PC 1S performs an initial setting of the user program on the tag type controller 20 attached to the workpiece 2 (S402). In addition to the user program, examples of the initial setting include an image processing item, an initial coordinate, a slave coordinate, and a slave setting information, but are not limited thereto.

The workpiece 2 to which the tag type controller 20 is attached is moved on the conveyer 3 (in FIG. 4, from the left to the right), and the tag type controller 20 continuously monitors the current position of the workpiece 2 on the conveyer 3 using the position detector 23. When detecting approach of the workpiece 2 to a height measuring instrument 100, the tag type controller 20 transmits the program and associated setting information to the height measuring instrument 100 in order to measure the height of the workpiece 2.

According to the transmitted program and associated setting information, the height measuring instrument 10C measures the height of the workpiece 2, and transmits a measurement result to the tag type controller 20 (S411).

The tag type controller 20 adds the height measurement result (for example, 11) of the workpiece 2, which is transmitted from the height measuring instrument 100, to an applicable field of the test result list LTR (S412).

The height measuring instrument 10C may be configured to be able to measure not only the height of the workpiece 2 but also the lengths in the longitudinal and crosswise directions of the workpiece 2. In such cases, the length (○○) in the longitudinal direction and the length (ΔΔ) in the crosswise direction of the workpiece 2, which are measured with the height measuring instrument 100, are transmitted to the tag type controller 20 together with the height in S411, and added to the applicable field of the test result list LTR in S412.

2 Shipment (1/2)

The worker of the supplier adds a test item "price" to the information provision list LIP with the supplier-side PC 1S to complete the information provision list LIP (S421).

For example, "P company (responsible person PC)" indicating a reception-side responsible person PC is set to the disclosure range of the test item "price" in the completed information provision list LIP. For example, "¥100" is set to the measured value of the test item "price". For example, "P company (image processing device and robot)" indicating the reception-side image processing device 10A and robot (for example, P & P device 10B) is set to the disclosure range of the test item "height". As described above, "11" is input to the measured value of the test item "height". As can be seen from another information provision list LIP in which "9" is input to the measured value of the test item "height", the measured value of the test item "height" is a characteristic value of each workpiece 2.

Then, the supplier-side PC 1S generates a function block FB based on the completed information provision list LIP, and transmits the function block FB to the tag type controller 20 attached to the workpiece 2 (S422).

Figure 5:
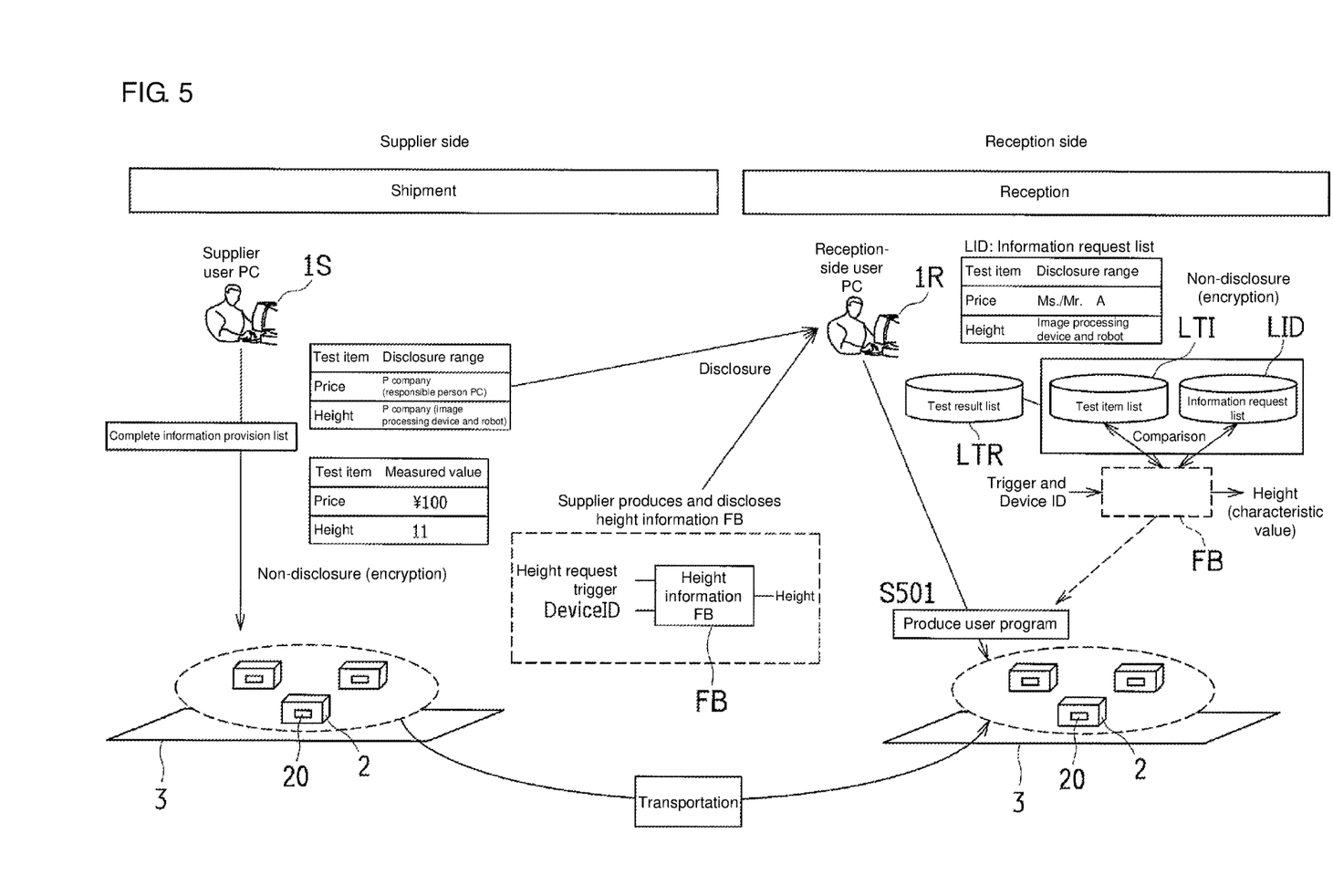
FIG. 5 is a schematic diagram illustrating a flow from the "shipment" on the supplier side to "reception" on a reception side in the screw test process of the production management system 100.

FIG. 5 is a schematic diagram illustrating a flow from the "shipment" on the supplier side to "reception" on a reception side in the screw test process of the production management system 100. Because the left side in FIG. 5 partially overlaps the right side in FIG. 4, the detailed description of the overlapping portion is omitted.

3 Shipment (2/2)

As described above with reference to FIG. 4, the information provision list LIP is completed with the supplier-side PC 1S. While the test item list LTI of the information provision list LIP is disclosed on the reception side, the test result list LTR is not disclosed (encrypted).

The function block FB (see S422) is also disclosed in order to obtain the height information about the workpiece 2, the height information about the workpiece 2 being produced by the supplier using the supplier-side PC 1S, In the function block FB, the "height" is output when a "height request trigger" and a "device ID" are input.

For example, in an industrial open network "EtherCAT", it is stipulated that the "device ID" is inserted in a predetermined place of a communication packet in order to identify the connected device. Specifically, assuming that VendorID VendorID is a manufacturer,
ProductCode: that ProductCode is a product name, and
RevisionCode: that RevisionCode is a revision number,
VendorID+ProductCode+RevisionCode corresponds to the "device ID". These pieces of information in EtherCAT are disclosed. Even a communication protocol except for EtherCAT can be adopted as the "device ID" as long as a similar mechanism is adopted.

Through these processes, the workpiece 2 is shipped from the supplier while the tag type controller 20 is attached to the workpiece 2, and the workpiece 2 is transported onto the reception side.

4 Reception (1/2)

On the reception side, an information request list LID is produced with a reception-side PC 1R. As used herein, the information request list LID means one in which each test item included in the information provision list LIP and each disclosure range desired by the reception side are listed while paired. For example, "Ms./Mr. A" which is one of on persons in charge on the reception side is set to the disclosure range desired by the reception side with respect to the test item "price". For example, "an image processing device and a robot" indicating the reception-side image processing device 10A and robot (for example, P & P device 10B) is set to the disclosure range desired by the reception side with respect to the test item "height".

Then, a user program in which the function block FB disclosed from the supplier is used is produced with the reception-side PC 1R, and the user program is transmitted to the tag type controller 20 (S501).

In the user program, when the "height request trigger" and the "device ID" are input to the function block FB, the disclosure range of the test item "height" in the test item list LTI of the information provision list LIP and the disclosure range of the test item "height" in the information request list LID are compared to each other to determine whether the disclosure range of the information request list LID is included in the disclosure range on the side of the information provision list LIP. For example, when the disclosure range on the side of the information provision list LIP is the "P company (image processing device and robot)" while the disclosure range of the information request list LID is the "image processing device and robot", a determination is made that the disclosure range of the information request list LID is included in the disclosure range on the side of the information provision list LIP. In this case, the test result list LTR is referred to, and the measured value "11" corresponding to the test item "height" is output as the height unique to the workpiece 2.

Figure 6:
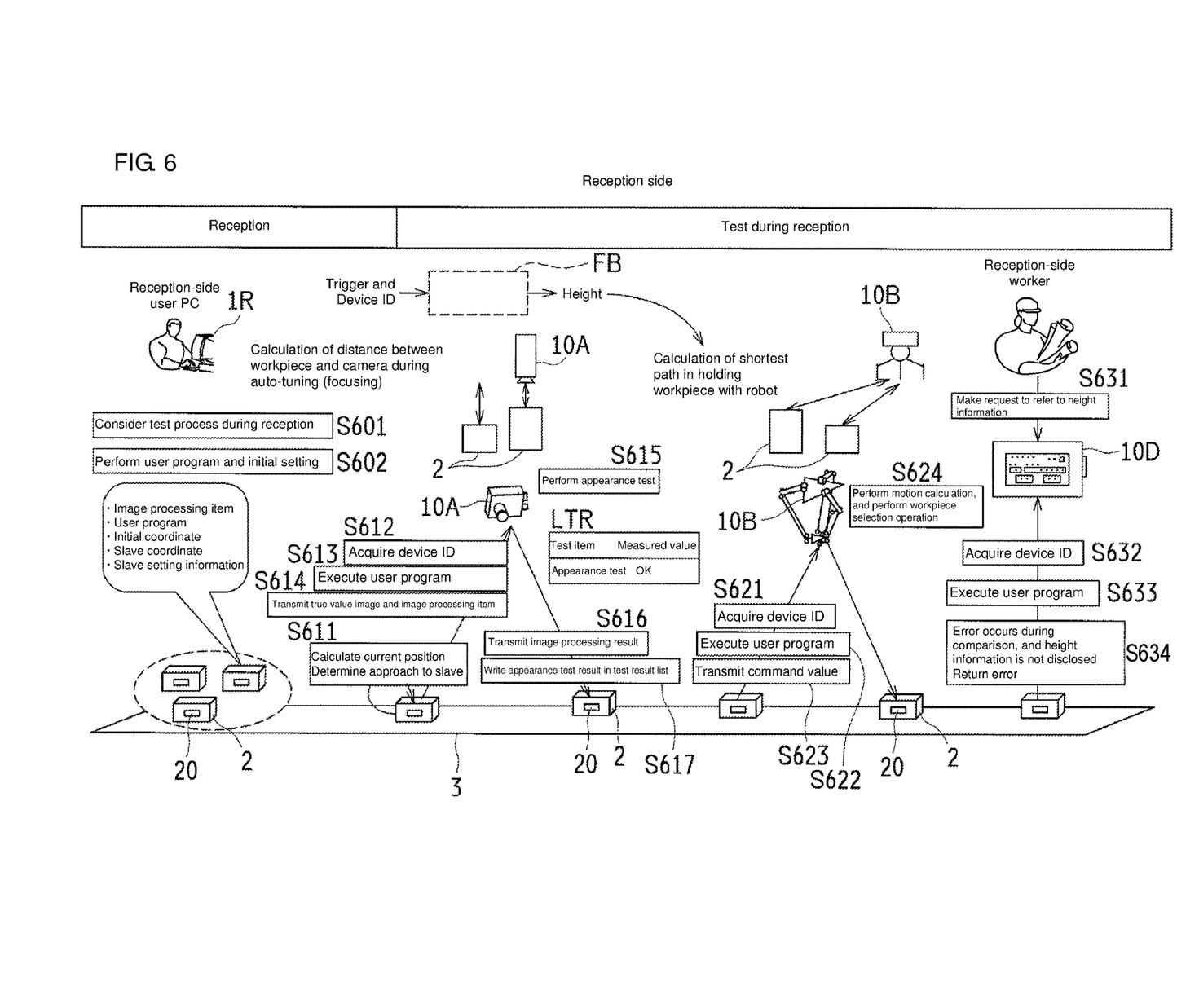
FIG. 6 is a schematic diagram illustrating a flow from the "reception" to a "test during reception" on the reception side in the screw test process of the production management system 100.

FIG. 6 is a schematic diagram illustrating a flow from the "reception" to a "test during reception" on the reception side in the screw test process of the production management system 100.

5 Reception (2/2)

First, the reception side considers the test process during reception (S601). For example, an optional process in the test during reception is extracted by providing information about a pre-shipment test from the supplier side.

On the basis of the result, the supplier-side PC 1S performs the initial setting of the user program on the tag type controller 20 attached to the workpiece 2 (S602). In addition to the user program, examples of the initial setting include an image processing item, an initial coordinate, a slave coordinate, and a slave setting information, but are not limited thereto.

6 Test During Reception

The workpiece 2 to which the tag type controller 20 is attached is moved on the conveyer 3 (in FIG. 4, from the left to the right), and the tag type controller 20 continuously monitors the current position of the workpiece 2 on the conveyer 3 using the position detector 23 to determine whether the workpiece 2 approaches the appearance test image processing device 10A that acts as a slave as seen from the tag type controller 20 (S611).

When determining that the workpiece 2 sufficiently approaches the image processing device 10A, the tag type controller 20 acquires the device ID of the workpiece 2 from the image processing device 10A (S612).

The user program is executed using the function block FB (S613). In the user program, when the disclosure range on the side of the information provision list LIP is the "P company (image processing device and robot)" while the disclosure range of the information request list LID is the "image processing device and robot", a determination is made that the disclosure range of the information request list LID is included in the disclosure range on the side of the information provision list LIP. Because the image processing device 10A is included in the "image processing device and robot", the test result list LTR is referred to, and the measured value "11" corresponding to the test item "height" is output as the height unique to the workpiece 2.

The tag type controller 20 transmits the true value image and the image processing item to the image processing device 10A together with the output height of the workpiece 2 (S614).

The image processing device 10A performs an appearance test of the workpiece 2 on the basis of the height, true value image, and image processing item of the workpiece 2, the height, true value image, and image processing item of the workpiece 2 being transmitted from the tag type controller 20 (S615). At this point, the height of the workpiece 2 is previously ascertained, so that the height of the workpiece 2 can effectively be used to calculate a distance between the image processing device during auto-tuning (focusing) and the image processing device 10A.

Then, the image processing device 10A transmits a result (for example, "OK") of the appearance test through the image processing to the tag type controller 20 (S616).

The tag type controller 20 writes the appearance test result transmitted from the image processing device 10A in the applicable field of the test result list LTR (S617).

When the conveyer 3 further moves the workpiece 2 to determine that the workpiece 2 sufficiently approaches the P & P device 10B, the tag type controller 20 acquires the device ID of the workpiece 2 from the P & P device 10B (S621).

The user program is executed using the function block FB (S622). In the user program, when the disclosure range on the side of the information provision list LIP is the "P company (image processing device and robot)" while the disclosure range of the information request list LID is the "image processing device and robot", a determination is made that the disclosure range of the information request list LID is included in the disclosure range on the side of the information provision list LIP. Because the P & P device 10B is included in the "image processing device and robot", the test result list LTR is referred to, and the measured value "11" corresponding to the test item "height" is output as the height unique to the workpiece 2.

On the basis of the output height of the workpiece 2, the tag type controller 20 calculates a shortest path through which the P & P device 10B holds the workpiece 2, and transmits the obtained result to the P & P device 10B as a command value (S623).

The P & P device 10B performs a motion calculation on the basis of the command value transmitted from the tag type controller 20, and performs selection operation of the workpiece 2 (S624). At this point, the height of the workpiece 2 is previously ascertained, so that the workpiece 2 can be held through the shortest path.

It is assumed that, when the workpiece 2 is further moved on the conveyer 3 to approach a display device 10D used by a reception-side worker, the display device 10D makes a request to refer to the height information about the workpiece 2 (S631).

The tag type controller 20 acquires the device ID from the display device 10D (S632).

The user program is executed using the function block FB (S633). In the user program, when the disclosure range on the side of the information provision list LIP is the "P company (image processing device and robot)" while the disclosure range of the information request list LID is the "image processing device and robot", a determination is made that the disclosure range of the information request list LID is included in the disclosure range on the side of the information provision list LIP.

However, because the display device 10D is not included in the "image processing device and robot", an error is generated during the comparison, and the measured value "11" corresponding to the test item "height", namely, the height information about the workpiece 2 is not output and is not disclosed (S634) in the display device 10D.

That is, the measured value of the height of the workpiece 2 is not displayed on a screen of the display device 10D, but the height information about the workpiece 2 is concealed from the reception-side worker.

Various changes and modifications can be made without departing from the gist or principal feature of the present invention. The above embodiment is described for illustrative purpose only, and limited interpretation should be avoided. The scope of the present invention is defined only by the claims, but not bound to the description of the embodiment. The changes and modifications equivalent to the claims are included in the present invention.

This application claims the priority based on Japanese Patent Application No. 2014-052347 filed with the Japan Patent Office on Mar. 14, 2014, the entire contents of which are incorporated herein by reference.

INDUSTRIAL APPLICABILITY

The present invention can be applied to not only the production management system or manufacturing management system in the factory but also various systems that manage a wide range of various kinds of work.

DESCRIPTION OF SYMBOLS 1 user PC
1S supplier-side PC
1R reception-side PC
2 workpiece
3 conveyer
4 conveyer driving controller
10 work device
10A image processing device
10B P & P device (robot)
10C height measuring instrument
10D display device
11 storage
12 communicator
13 work part
14 control part
20 tag type controller
21 storage
22 communicator
23 position detector
24 calculation controller
25 power supply
100 production management system
LTI test item list
LTR test result list
LIP information provision list
LID information request list

The invention claimed is:

1. A work process management system in an on-demand multi-product production environment, the system comprising:
a work device comprising:
  a work-device-side communicator comprising a first transmitter, a first receiver, and a first antenna, the work-device-side communicator configured to conduct external radio communication, and configured to transmit characteristic identification information;
  a work part comprising a production machine configured to perform at least one work process on a work object;
  a work-device-side control part comprising a first processor configured to perform operations comprising:
    transmitting an access request to access associated information associated with a work content of the work process, or the work object through the work-device-side communicator, and
    controlling the work process performed with the work part based on a reception result received in response to the access request and a command received through the work-device-side communicator, and
an individual controller attached to the work object, the individual controller controlling the work device, the individual controller comprising:
  a second processor;

an individual-controller-side storage comprising a memory, in which the work content of the work process, the associated information, and access restriction information about the associated information are stored with respect to the work object;

an individual-controller-side communicator comprising a second transmitter, a second receiver, and a second antenna, the individual-controller-side communicator configured to perform external radio communication; and an individual-controller-side calculation controller comprising the second processor, the second processor configured to perform operations comprising:
calculating a command value to be transmitted in the command for the work device to perform the work content of the work process, the command value calculated based on: a kind of the work device determined based on the characteristic information received from the work device; and the associated information associated with the work content of the work process, or the work object, transmitting the command to the work-device-side communicator of the work device through the individual-controller-side communicator, in response to receiving the access request to access the associated information from the work device through the individual-controller-side communicator, determining whether the access is permitted based on the access restriction information and the kind of the work device, and transmitting the associated information to the work device through the individual-controller-side communicator only when permitting the access, wherein the work device performs the work process based on the transmitted associated information and the transmitted command.

2. The work process management system according to claim 1, wherein the access restriction information comprises:

first access restriction information previously stored in the individual-controller-side storage; and second access restriction information that is subsequently stored in the individual-controller-side storage to further restrict an access restriction range of the first access restriction information.

3. The work process management system according to claim 2, wherein rewriting of the first access restriction information is prohibited.

4. The work process management system according to claim 1, wherein the individual-controller-side calculation controller is configured to perform operations further comprising determining whether access is permitted based on the access restriction information is mounted using a function block.

5. An access restriction method for restricting access to associated information associated with a work content of a work process or a work object in an individual controller attached to the work object to control a work device configured to perform at least one work process on the work object, the access restriction method comprising:

storing the work content of the work process, the associated information, and access restriction information about the associated information with respect to the work object of a corresponding kind in a memory of the individual controller;

when an access request to access the associated information is received by radio from the work device, identifying a kind of the work device based on characteristic identification information about the work device, the characteristic identification information being received by radio from the work device and determining whether the access is permitted based on the access restriction information;

transmitting the associated information to the work device only when the access is permitted;

calculating, by the individual controller, a command value to be transmitted in the command for the work device to perform the work content of the work process, the command value calculated based on: the kind of the work device determined based on characteristic information of the work device; and the associated information associated with the work content of the work process, or the work object; and transmitting the command to the work device, wherein the work device performs the work process based on the transmitted associated information and the transmitted command.

6. The access restriction method according to claim 5, wherein the storing comprises:

storing first access restriction information; and subsequently storing second access restriction information further restricting an access restriction range of the first access restriction information.

* * * * *